US006958768B1

(12) United States Patent
Rao et al.

(10) Patent No.: US 6,958,768 B1
(45) Date of Patent: Oct. 25, 2005

(54) CMOS INSPECTION APPARATUS

(75) Inventors: Sreenivas Rao, Singapore (SG); Noor Ashedah Binti Jusoh, Singapore (SG)

(73) Assignee: ASTI Holdings Limited, Singapore (SG)

( * ) Notice: Subject to any disclaimer, the term of this patent is extended or adjusted under 35 U.S.C. 154(b) by 779 days.

(21) Appl. No.: 09/693,323

(22) Filed: Oct. 20, 2000

(51) Int. Cl.$^7$ .............................................. H04N 7/18
(52) U.S. Cl. ......................... 348/86; 348/92; 348/294
(58) Field of Search ............................... 348/241, 294, 348/296, 308, 86, 92, 93

(56) References Cited

U.S. PATENT DOCUMENTS

| | | | |
|---|---|---|---|
| 5,990,469 A * | 11/1999 | Bechtel et al. ........... | 250/208.1 |
| 6,512,218 B1 * | 1/2003 | Canini et al. ............ | 250/208.1 |
| 6,515,701 B2 * | 2/2003 | Clark et al. .................. | 348/308 |
| 6,519,371 B1 * | 2/2003 | Pain et al. ................... | 382/288 |
| 6,681,038 B2 * | 1/2004 | Vilella ........................ | 382/145 |

OTHER PUBLICATIONS

A. Krymski et al.; "A High Speed, 500 Frames/s, 1024+1024 CMOS Active Pixel Sensor"1999 Symposium of VLSI Circuits of Technical Papers, Jun. 1999, pp. 137-138.*

E. R. Fossum; "Acitve Pixel Sensors: Are CCD's Dinosaurs?" Proc. SPIE, Feb. 1993, vol. 1900 pp. 2-14.*
E. Fossum; "High Speed CMOS Imaging" Digest of the LEOS Summer Topical Meetings, Jul. 24-28, 2000, pp. 13-14.*
A. Krymski et al.; "A High Speed, 500 Frames/s, 1024×1024 CMOS Active Pixel Sensor"1999 Symposium of VLSI Circuits of Technical Papers, Jun. 1999, pp. 137-138.*

* cited by examiner

Primary Examiner—Wendy R. Garber
Assistant Examiner—Timothy J. Henn
(74) Attorney, Agent, or Firm—Christopher J. Rourk; Godwin Gruber LLP

(57) ABSTRACT

A system for inspecting components is provided. The system includes a CMOS imaging system generating image data, such as pixel data from a pixel array. An image analysis system is connected to the CMOS imaging system, the image analysis system receiving the image data and generating image analysis data. The CMOS imaging system generates the image data at a rate that allows the CMOS imaging device to be used for inspecting components.

15 Claims, 5 Drawing Sheets

CMOS INSPECTION APPARATUS

FIELD OF THE INVENTION

The present invention pertains to the field of semiconductor devices, and more particularly to a system and method for inspecting semiconductor devices that uses CMOS image data acquisition.

BACKGROUND

Complementary metal-oxide semiconductor (CMOS) imaging systems are known in the art. Such CMOS imaging systems use CMOS devices having an array of picture elements (pixels) to generate digital image data. The digital image data from such CMOS devices is then processed and stored, such that the image can be recreated from the stored pixel data.

Although such CMOS imaging systems are known in the art, they have not been applied to component inspection systems. One reason why such CMOS imaging systems have not been used is because the speed of image processing is slower than equivalent systems and methods, such as systems utilizing Charge Coupled Devices (CCDs) or methods requiring operator review of image data. In addition, earlier attempts to increase camera speed resulted in image distortion. One reason for such image distortion may have been the minimum settling time required before the CMOS sensor could capture the next image. Other problems have also been encountered, such as poor image quality that rendered the pixel data generated by the CMOS sensor unusable.

Thus, although CMOS sensors have been applied for various imaging applications, the application of CMOS sensors for component inspection has not been accomplished because of these problems.

SUMMARY OF THE INVENTION

In accordance with the present invention, a system and method for component inspection with CMOS imaging are provided that overcome known problems with component inspection systems and methods.

In particular, a system and method for component inspection with CMOS imaging are provided that allow CMOS imaging to be used to generate pixel data at a faster speed and with an image quality that allows the pixel data to be used in conjunction with component inspection systems and methods.

In accordance with an exemplary embodiment of the present invention, a system for inspecting components is provided. The system includes a CMOS imaging system generating image data, such as pixel data from a pixel array. An image analysis system is connected to the CMOS imaging system, the image analysis system receiving the image data and generating image analysis data. The CMOS imaging system generates the image data at a rate that allows the CMOS imaging device to be used for inspecting components.

The present invention provides many important technical advantages. One important technical advantage of the present invention is a system and method for inspecting components that utilizes a CMOS imaging sensor, which creates images of greater clarity than previously known methods and systems for generating image data. The present invention reduces the noise in the CMOS imaging sensor that might otherwise render the CMOS image data unusable. Likewise, the present invention increases image generation speed to allow the image data generated by the CMOS sensor to be used for component inspection.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

Figure 1:
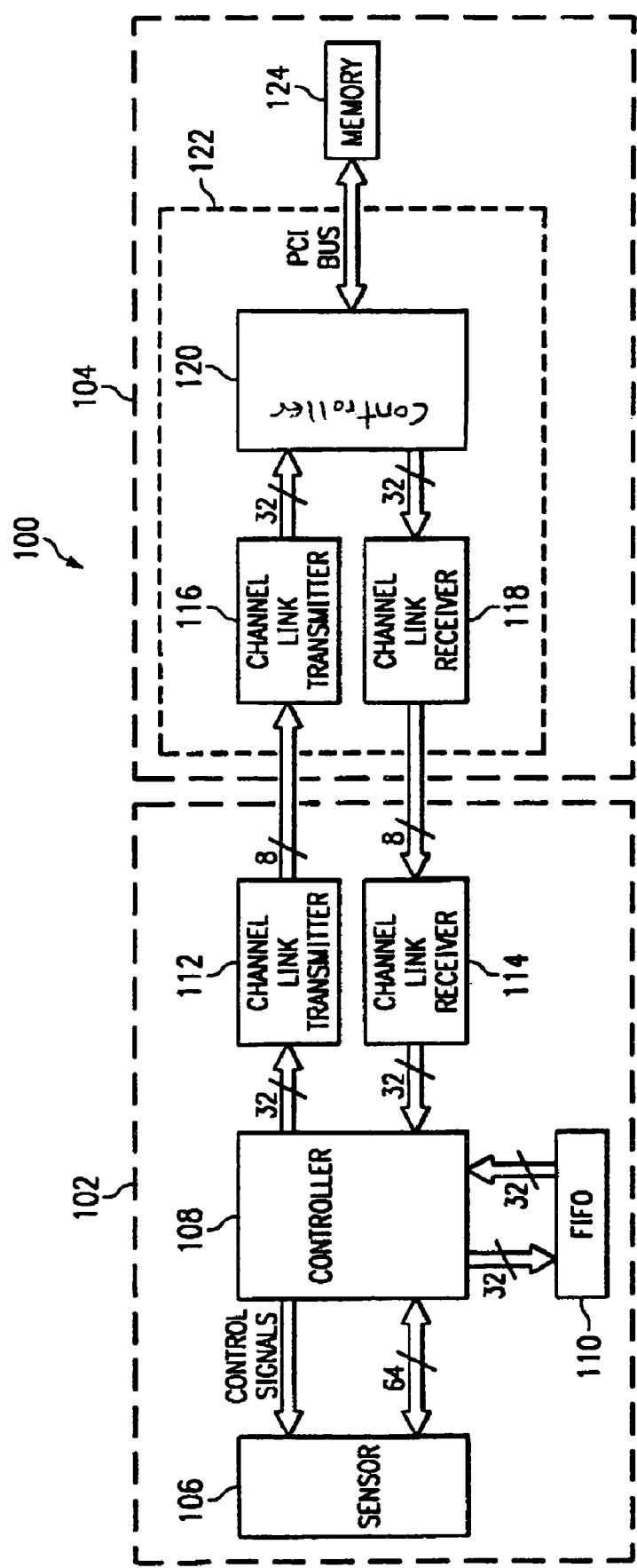
FIG. 1 is a diagram of a system for performing component inspection using CMOS imaging in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of system 100 for performing component inspection using CMOS imaging in accordance with an exemplary embodiment of the present invention. System 100 uses a CMOS sensor and dedicated processing circuitry to increase the speed of image processing so that the CMOS sensor can be used to generate component inspection image data for commercial applications.

System 100 includes digital camera 102, which is coupled to processor 104. As used herein, the term "couple" and its cognate terms such as "couples" and "coupled" can include a physical connection (such as through a copper conductor), a virtual connection (such as through one or more randomly assigned memory locations of a data memory device), a logical connection (such as through one or more logical devices of a semiconducting circuit), other suitable connections, or suitable combination of such connections. In one exemplary embodiment, systems and components are coupled to other systems and components through intervening systems and components, such as through an operating system of a processing platform. In another exemplary embodiment, digital camera 102 and processor 104 can be coupled without the channel link within a single housing, such as in an embedded imaging system.

Digital camera 102 includes CMOS imaging sensor 106, which is coupled to controller 108. Controller 108 is coupled to first-in, first-out (FIFO) buffer 110, channel link transmitter 112, and channel link receiver 114.

CMOS imaging sensor 106 includes a plurality of rows and columns of CMOS pixels and a focusing device that focuses an image on the sensor. In one exemplary embodiment, CMOS imaging sensor 106 can be a CMOS active pixel sensor. In another exemplary embodiment, CMOS imaging sensor 106 can be a CMOS device manufactured by Photobit Corporation of Pasadena, Calif., such as Model Number PB1024. In this exemplary embodiment, CMOS imaging sensor 106 includes a 1024×1024 array of CMOS imaging devices, where each imaging device generates one pixel of data.

Controller 108 generates control data for CMOS imaging sensor 106 and receives image data generated by CMOS imaging sensor 106 over a 64-bit bus or other suitable connection. In one exemplary embodiment, controller 108 can be a field programmable gate array (FPGA), such as a Spartan XL FPGA manufactured by Xilinx, Inc. of San Jose, Calif. In one exemplary embodiment, controller 108 allows image acquisition to take place at the rate of 13.5 milliseconds per image, and image data processing to occur at the rate of 300 million instructions per second by using an FPGA with intelligent processing cores programmed into them. The present invention thus eliminates the need for using expensive frame grabbers, and significantly speeds image acquisition from prior art systems and methods that required 32 milliseconds or greater per frame.

Controller 108 stores the image data from CMOS imaging sensor 106 in FIFO buffer 110 for transmission to an image processor or other suitable systems or components, and interfaces with channel link transmitter 112 to transmit the image data to processor 104. Channel link receiver 114 receives control data from processor 104, such as reset control data.

Processor 104 can be a general purpose processing platform such as a personal computer that includes controller interface 122. Controller interface 122 couples to the processor's Peripheral Component Interconnect (PCI) bus or other suitable data transmission systems or components. Processor 104 is used to operate one or more image analysis systems, which use the image data to determine whether the component is acceptable or potentially includes flaws that require it to be removed from production. Processor 104 can also provide a user interface system to allow the user to control the generation of image data, such as by allowing the user to trigger image acquisition. Controller interface 122 further includes bus controller 120, which is coupled to channel link transmitter 116, channel link receiver 118 and memory 124. Bus controller 120 is used to control data transmission through channel link transmitter 116 and channel link receiver 118, and storage of image data to memory 124. In one exemplary embodiment, bus controller 120 can be a Spartan40 FPGA available from Xilinx, Inc. of San Jose, Calif.

FIFO buffer 110 can be used to receive one frame or more of pixel data from controller 108 and store the data for subsequent transmission to an image processor or other suitable systems or components. In one exemplary embodiment, FIFO buffer 110 can store 1.048 million pixels of data, and can be an IDT model 72V36110 device. The image processor can be a Virtex FPGA with firmware that performs one or more image processing algorithms, such as determination of a row projection vector, image correlation, edge detection, and blob detection. FIFO buffer 110 eliminates the need for coordination between the image processor and controller 108, thus allowing controller 108 to provide faster image data processing.

In operation, system 100 provides high-speed image data acquisition for use in component inspection. System 100 uses optimized line transfer rates, frame transfer rates, and data image processing in order to increase the speed of CMOS image data generation and processing to commercially acceptable rates.

Figure 2:
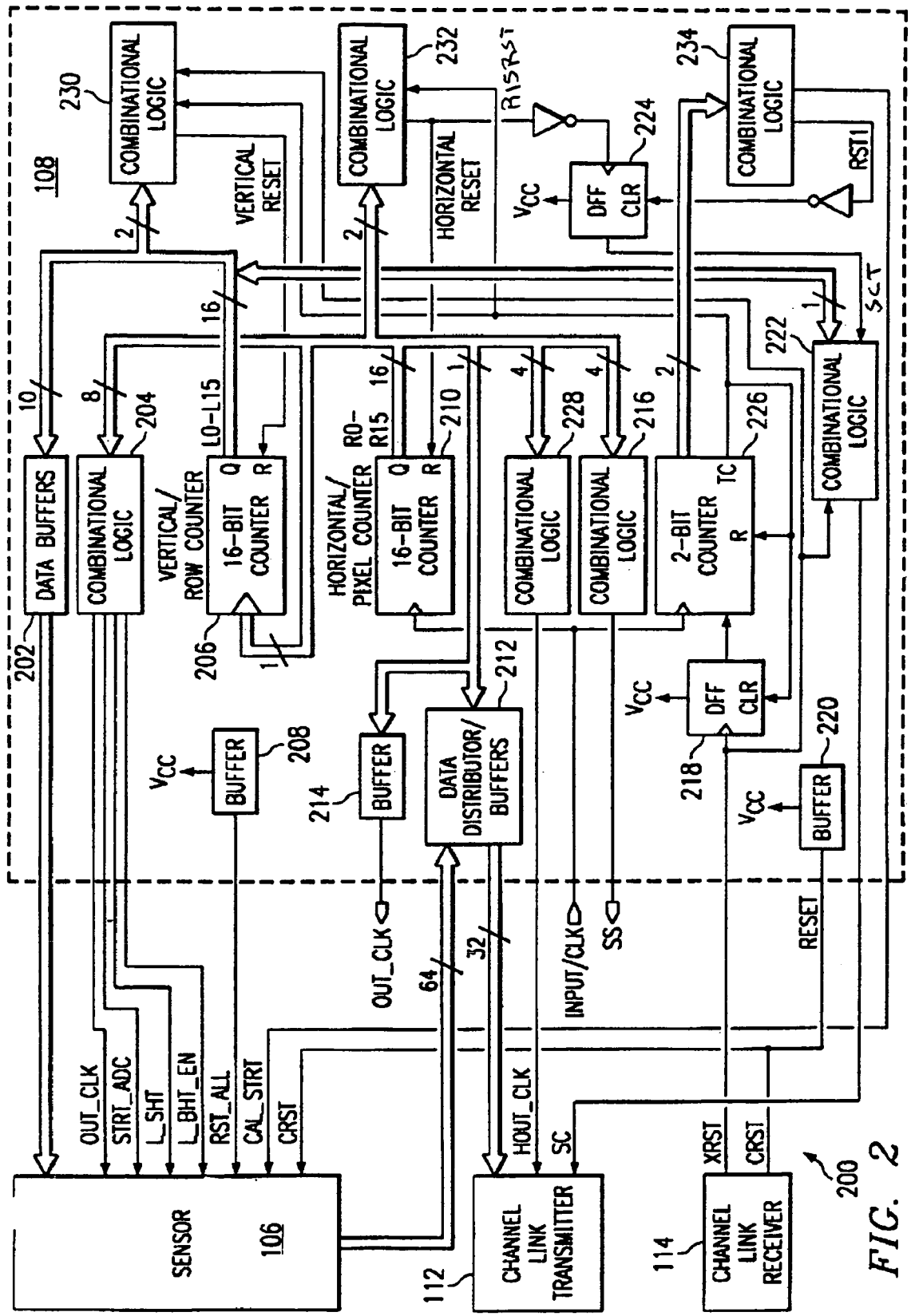
FIG. 2 is a diagram of a system for processing CMOS image data in accordance with an exemplary embodiment of the present invention.

FIG. 2 is a diagram of a system 200 for processing CMOS image data in accordance with an exemplary embodiment of the present invention. System 200 provides additional details of an exemplary embodiment of a controller 108 for use in processing CMOS image data.

System 200 includes CMOS imaging sensor 106, channel link transmitter 112, channel link receiver 114, and controller 108, which further comprises data buffer 202, combinational logic 204, 16-bit counter 206, buffer 208, 16-bit counter 210, data distributors/buffers 212, buffer 214, combinational logic 216, reset receiver 218, combinational logic 220, 222, and 224, 2 bit counter 226, and combinational logic 228, 230, 232, and 234, each of which can be implemented in hardware, software, or a suitable combination of hardware and software, and which can each be implemented as field programmable gate array architecture components.

CMOS imaging sensor 106 receives row address control data from controller 108, output clock control data OUT_CLK, start analog to digital conversion control data STRT_ADC, line shift control data L_SHT, line shift enable control data L_SHT_EN, calibration start control data CAL_STRT, capture reset control data CRST, and reset all control data RST_ALL from controller 108, and generates a 1024×1024 array of pixel data over eight 8-bit parallel ports (64 parallel bits total). The row address data is used to control output multiplexing from each of the eight 8-bit parallel ports so as to generate frames of image data having 1024 lines, where each lines further includes 1024 rows of pixels. Thus, controller 108 receiving the pixel data from CMOS imaging sensor 106 and generates pixel line data based on the control data provided to CMOS imaging sensor 106.

The output clock input to CMOS imaging sensor 106 controls the timing operation of components of CMOS imaging sensor 106, and is used to coordinate the operation of CMOS imaging sensor 106 with controller 108. The start analog to digital conversion control data is used to initiate the operation of an on-chip 8 bit column parallel analog to digital conversion system or other suitable systems. The line shift control data causes the generation of each line of pixel data to be initiated, and the line shift enable control data causes CMOS imaging sensor 106 to start generation and output of the pixel data over the 64 bit parallel data bus.

The calibration start control data controls calibration of CMOS imaging sensor 106. The capture reset control data is used to initiate the generation of pixel data for a frame, starting from the first row of the first line and then sweeping across each succeeding line in a predetermined manner.

To generate these and other control data, controller 108 includes 16-bit counter 206 and 16-bit counter 210, which are each 16-bit counter systems operating on controller 108. Registers L0 through L9 of 16-bit counter 206 are used to generate the row address control data for the 1,024 rows addresses output through CMOS imaging sensor 106. Only the first 10 bits of 16-bit counter 206 are needed to control the generation of row initiation control data for a sensor having 1,024 rows per line. Output from 16-bit counter 210 is used in conjunction with combinational logic 204 to generate the output clock control data, the start analog to digital conversion control data, the line shift control data, and the line shift enable control data for provision to CMOS imaging sensor 106. Output from 16-bit counters 206 and 210 is also used to control output clock control data and image initiation control data.

Data distributors/buffers 212 receives the 64-bit parallel image data output from CMOS imaging sensor 106 and additional data from 16-bit counter 210, and transfers the image data to channel link transmitter 112 over a 32-bit parallel bus. The process of receiving a frame of image data from CMOS imaging sensor 106 starts with the generation of the XRST control data from a host system. Prior to this, the CRST control data is transmitted to CMOS imaging sensor 106 to provide a logical reset point as well as to initiate the analog to digital calibration sequence for CMOS imaging sensor 106. The CRST control data is provided to controller 108, which uses the CRST control data to generate the analog digital conversion control. Likewise, the XRST control from channel link receiver 114 is used in conjunction with combinational logic 230 and 232 to generate the horizontal and vertical reset command inputs to 16-bit counters 206 and 210.

In operation, system 200 generates image data in conjunction with a CMOS sensor for use in performing component inspection. System 200 provides optimized line transfer, frame transfer, and image data generation such that the image data generated through CMOS imaging sensor 106 can be used to perform component inspection. System 200 overcomes limitations of the prior art by providing high quality image data in a manner that facilitates the use of the image data for inspecting components.

Figure 3:
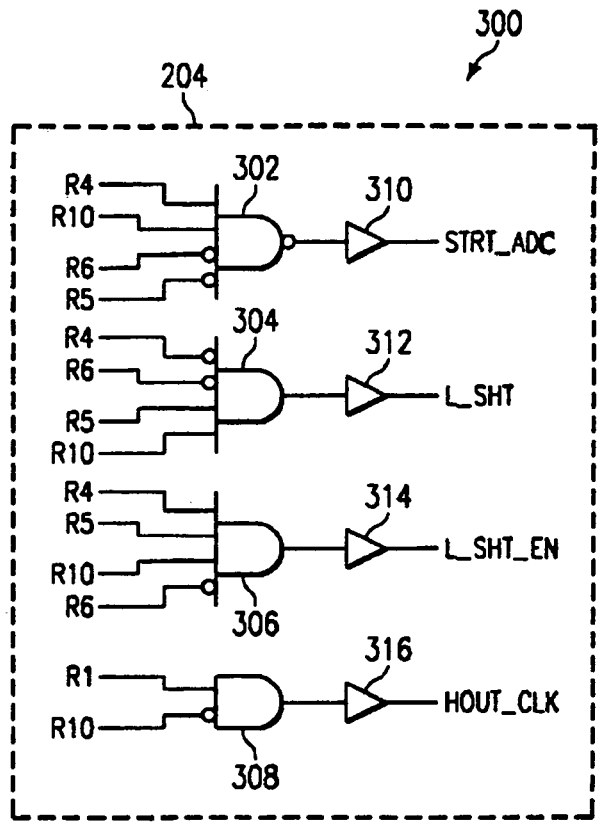
FIG. 3 is a diagram of a system for providing control data for controlling a CMOS image sensor in accordance with an exemplary embodiment in the present invention.

FIG. 3 is a diagram of a system 300 for providing control data for controlling a CMOS image sensor in accordance with an exemplary embodiment in the present invention. System 300 can be implemented in an FPGA such as controller 108.

System 300 includes combinational logic 204 and NAND gate 302, AND gates 304, 306, and 308, and buffers 310 through 316. NAND gate 302 receives outputs R4 and R10 from 16-bit counter 210 and combines them with inverted outputs R5 and R6 from 16-bit counter 210. The output from NAND gate 302 is then delayed by buffer 310 for one clock cycle and is used to generate the START ADC control data for the initiation of analog to digital conversion.

AND gate 304 receives outputs R5 and R10 from 16-bit counter 210 and inverted outputs R4 and R6 and generates the L_SHT control data, which is stored in buffer 312 for one clock cycle. Likewise, AND gate 306 receives outputs R4, R5, and R10 from 16-bit counter 210 and inverted R6, and generates the L_SHT_EN control data after storage in buffer 314. The OUT_CLK control data to CMOS imaging sensor 106 is generated by combining the R1 and inverted R10 inputs from 16-bit counter 210 through AND gate 308.

In operation, system 300 is used to generate the STRT_ADC control data, the L_SHT control data, the L_SHT_EN control data and the OUT_CLK control data for provision from controller 108 to CMOS imaging sensor 106. System 300 generates the L_SHT_EN control data after four clock cycles have elapsed, as opposed to prior art systems that generated the L_SHT_EN control data in three or less clock cycles. In this manner, the line data generated by CMOS imaging sensor 106 does not include noise and other problems that have been observed in the prior art that prevent CMOS sensors from being used to generate image data for component inspection. In addition, system 300 causes line data to be generated at an optimal speed, such that the amount of time between the completion of a first line and the initiation of the next line is reduced to less than 250 clock cycles, and in one exemplary embodiment, to 16 clock cycles. Thus, system 300 allows pixel data to be generated from CMOS sensor image data that can be used for component data inspection and that further allows the data to be generated at a rate that makes component inspection faster than other known systems and methods.

Figure 4:
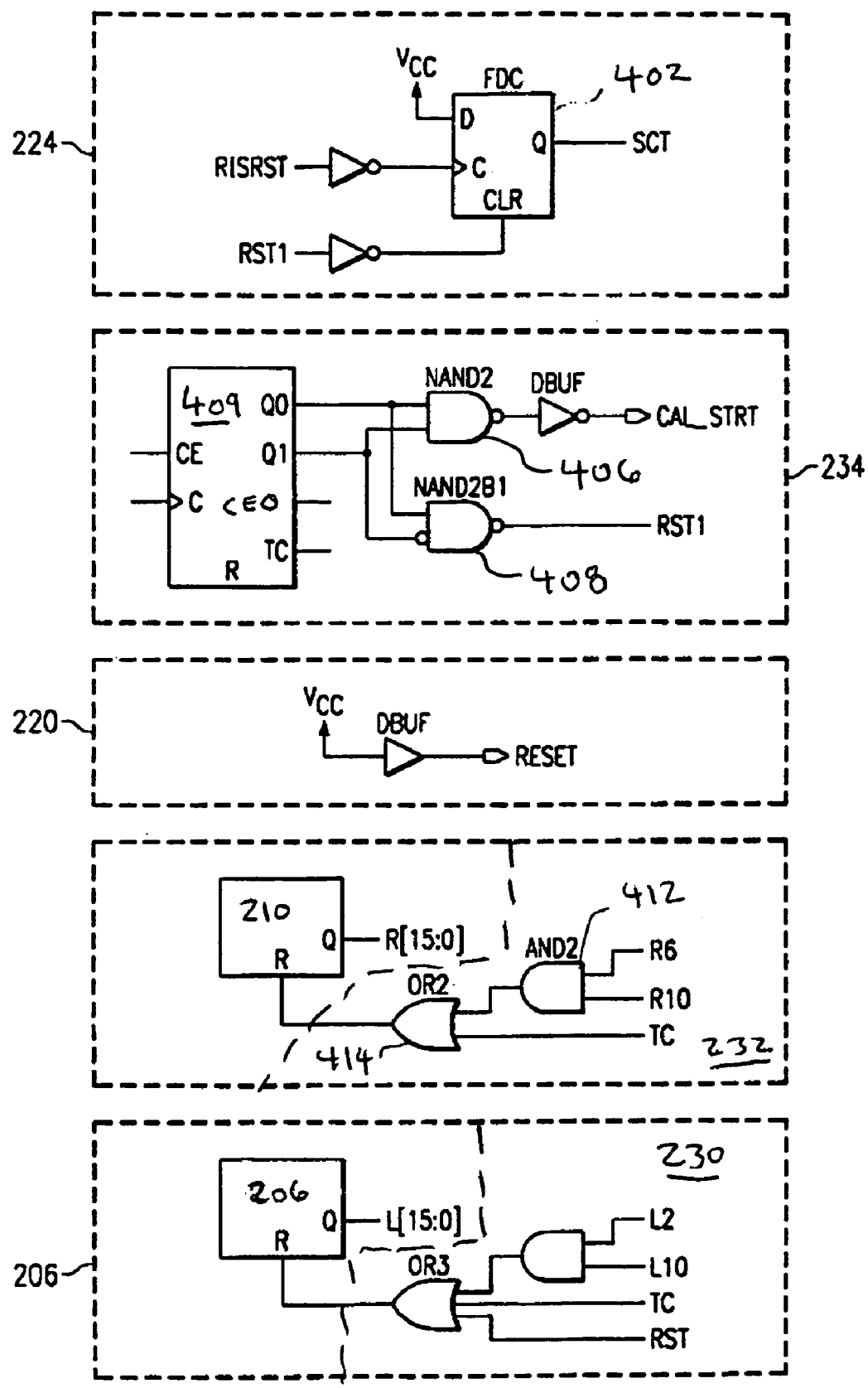
FIG. 4 is a diagram of combinational logic and other control component details in accordance with an exemplary embodiment of the present invention.

FIG. 4 is a diagram of combinational logic 224, 230, 232, 234, and other control component details in accordance with an exemplary embodiment of the present invention. In the exemplary embodiment shown in FIG. 4, combinational logic 224 includes a delay flip-flop where the "D" input is tied to ground or Vcc, and where the clock input receives the reset command from combinational logic 232, which is used to generate the 16-bit counter 210 reset command. Likewise, combinational logic 224 receives inverted R15RST control data at the clock input to the flip-flop, and inverted RST1 control data at the clear input from combinational logic 234, which is derived from the XRST control data received via channel link receiver 114. In this manner, the SCT output of combinational logic 224 is normally off when a reset signal is received from combinational logic 234, which causes the clear input to drop to zero such that the R15RST reset signal can be used to control the state of the flip-flop.

Combinational logic 234 receives 2 bit counter output from 2 bit counter 226, which is triggered from control data derived from XRST control data input received through reset receiver 218. This input is received by binary counter 404 generating outputs Q0 and Q1 which are input into NAND gates 406 and 408. Output Q1 is inverted before being fed into NAND gate 408. The output from NAND gate 406 is used to generate the CAL_STRT control data output, whereas the output from NAND gate 408 is used to generate the RST1 control data. Combinational logic 220 is used to tie the reset input to Vcc unless a reset input is received from channel link receiver 114.

Combinational logic 232 receives inputs R6 and R10 from 16-bit counter 210, which are input to AND gate 412, the output of which is provided to OR gate 414 with Tc. The output from OR gate 414 is used to reset counter 410. Thus, when one of a Tc input or both the R6 and R10 inputs are on, then 16-bit counter 210 will be reset.

16-bit counter 206 receives an input from combinational logic 230, which includes AND gate 416 receiving inputs L2 and L10 from 16-bit counter 206. The output of AND gate 416 is fed into OR gate 418 with the Tc control data and the RST control data. 16-bit counter 206 is thus reset upon the receipt of an "on" value for RST control data, or TC control data, or two clock cycles after the completion of a 1,024 horizontal pixel count. Thus, 16-bit counter 206, and combinational logic 230 comprise a framing system that generates frames of image data at a rate greater than one frame every 30 milliseconds, and in particular, at 13.5 milliseconds per frame.

In operation, combinational logic 224, 234, 220, 232, and 230 control the operation of controller 108 and CMOS imaging sensor 106 such that image data generated by CMOS imaging sensor 106 can be used to form frames of data at a commercially useable rate. Combinational logic 224, 234, 220, 232, and 230 can be implemented in hardware, such as an FPGA, so as to increase the processing speed of the data. Likewise, software or a suitable combination of software and hardware can also be used to create combinational logic 224, 234, 220, 232, and 230.

Figure 5:
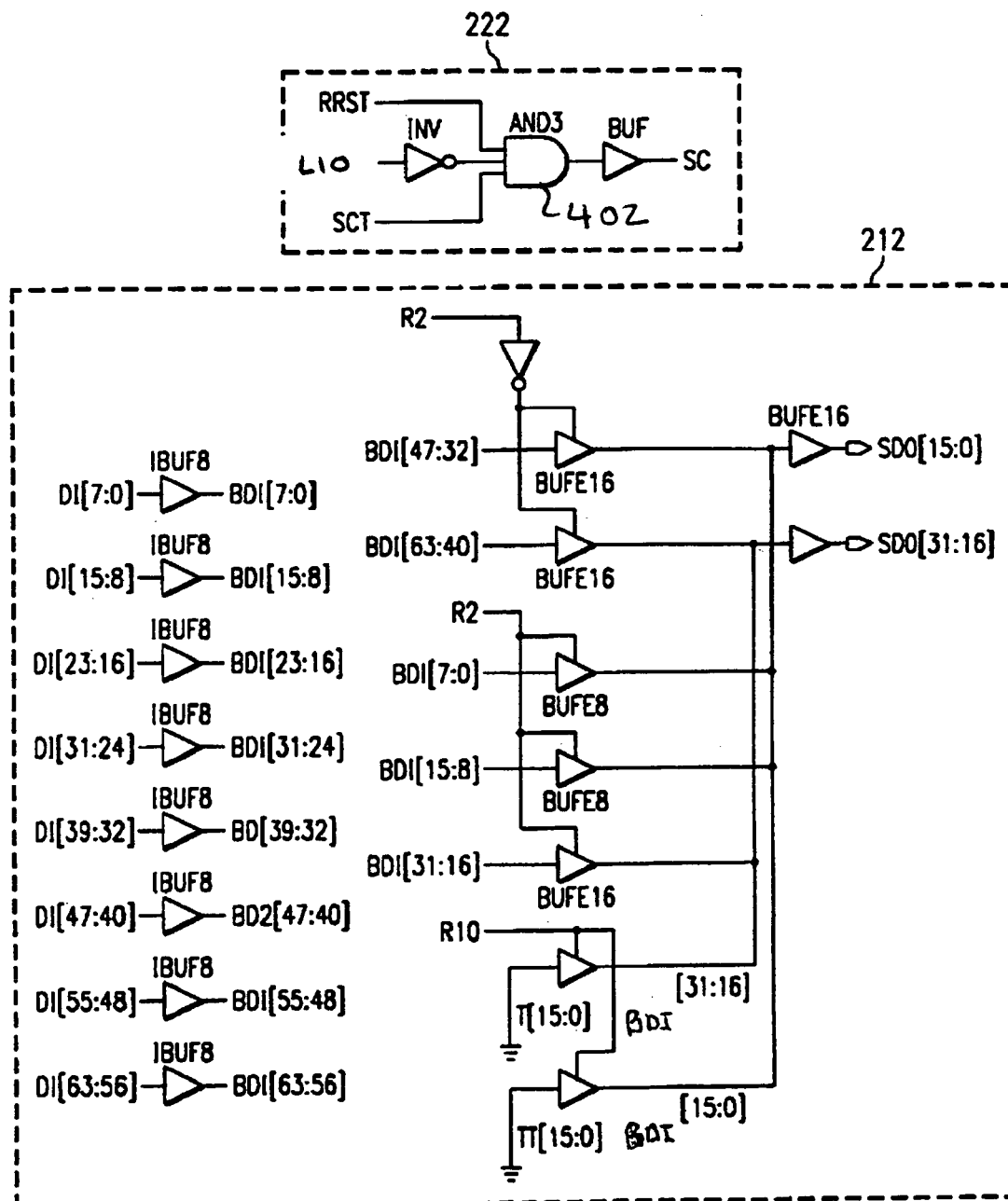
FIG. 5 is a diagram of combinational logic and data distributor buffers in accordance with an exemplary embodiment of the present invention.

FIG. 5 is a diagram of combinational logic 222 and data distributors/buffers 212 in accordance with an exemplary embodiment of the present invention. Combinational logic 222 receives RST control data, an inverted L10 input from 16-bit counter 206 and the SCT command and combines them in AND gate 402 to create output SC, which is buffered for one clock cycle. This output is then provided to channel link transmitter 112 as the SC data output. Therefore, the SC command or is on when a reset is received, and SCT command is received and when the value of L10 is zero.

Data distributors/buffers 212 receive the 8 port outputs from CMOS imaging sensor 106 and combine the 8 port outputs into 32 differential signals. In this manner, data distributors/buffers 212 uses differential encoding to convert a 64 bit parallel bus into a 32 bit parallel bus with no loss of data. Combinational logic 222 and data distributors/buffers 212 operate as a pixel shift system that rejects the first four pixels of data for each line and initiates line transfer at the fifth pixel series position, as opposed to prior art systems that started line transfer at the fourth series position of each line. The pixel shift system of combinational logic 222 and data distributors/buffers 212 eliminates image distortion that was caused by prior art systems that rendered the image data unusable for component inspection.

In operation, combinational logic 222 and data distributors/buffers 212 are used to process image data from a CMOS sensor for use in component inspection. Combinational logic 222 and data distributors/buffers 212 can be implemented in hardware, such as an FPGA, so as to increase the processing speed of the data. Likewise, software or a suitable combination of software and hardware can also be used to create combinational logic 222 and data distributors/buffers 212.

Figure 6:
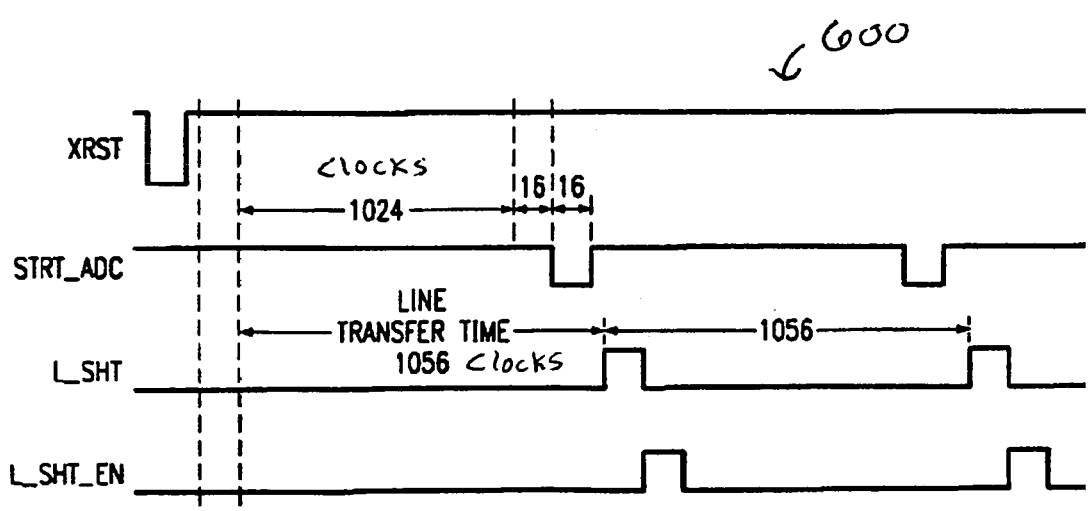
FIG. 6 is a timing diagram showing the timing of control data in accordance with an exemplary embodiment of the present invention.

FIG. 6 is a timing diagram 600 showing the timing of control data in accordance with an exemplary embodiment of the present invention. Timing diagram 600 includes the XRST control data and STRT_ADC control data, the L_SHT control data, and the L_SHT_EN control data. After generation of the XRST control data, line data is generated for 1,024 clock cycles until the generation of the STRT_ADC control data. The L_SHT control data and L_SHT EN control data is generated within one clock cycle afterwards. Thus, the transfer time for one line is 1,056 clock cycles. A 16 clock cycle buffer zone is used between initiation of the analog to digital conversion and the end of the previous line transfer, as opposed to prior art methods that required 208 clock cycles or longer between the end of the line transfer and the generation of the next STRT_ADC command. Likewise, the transfer of the line is initiated by the L_SHT_EN control data, such that the line transfer time is completed in 1,056 clock cycles. In one exemplary embodiment, a clock cycle occurs in 12.5 nanoseconds such that each line acquires 13.2 microseconds for transmission, as opposed to prior art methods that required 15.6 microseconds or greater for each line transfer.

Known systems and methods for line transfer utilize a 1248 clock cycle line transfer time or greater, such that 15.6 microseconds is required for the transfer of one line of pixel data. Thus, a system generating control data in accordance with timing diagram 600 allows transfer of a line of data to occur within less than 15 microseconds, and ultimately at 13.2 microseconds.

Likewise for 1,024 rows of line data, the frame transfer time is 1,024 times 12.5 nanoseconds, or 13.5 milliseconds. Known systems and methods ignored the first frame generated after reset, with an additional 16 cycle delay between frames, such that the data transfer time for a frame image was 1040 times 15.6 microseconds times two, or greater than 32 milliseconds. Thus, the resent invention significantly increases the image transfer time.

Although exemplary embodiments of a system and method for CMOS image data acquisition have been described in detail herein, those skilled in the art will also recognize that various substitutions and modifications can be made to the systems and methods without departing from the scope and spirit of the appended claims.

What is claimed is:

1. A system for inspecting components comprising:
   a CMOS imaging system generating image data;
   an image analysis system coupled to the CMOS imaging device, the image analysis system receiving the image data and generating image analysis data;
   a processor coupled to the image analysis system, the processor operating one or more additional software systems used for image data analysis, wherein the processor, the image analysis system, and the CMOS imaging system are an embedded imaging system; and
   wherein the CMOS imaging system generates the image data at a rate that allows the CMOS imaging device to be used for inspecting components in response to line shift control data received from the image analysis system.

2. The system of claim 1 wherein the CMOS imaging system further comprises a CMOS active pixel sensor.

3. The system of claim 2 wherein the CMOS active pixel sensor is a Photobit model PB 1024 CMOS active pixel sensor.

4. The system of claim 1 wherein the CMOS imaging system further comprises an image analysis controller receiving pixel data from a sensor and generating the image data from the pixel data.

5. The system of claim 1 wherein the CMOS imaging sensor generates lines of image data at a speed greater than one line every 15.6 microseconds.

6. The system of claim 1 wherein the CMOS imaging sensor generates frames of image data at a rate greater than one frame every 30 milliseconds.

7. The system of claim 1 wherein the CMOS imaging sensor further comprises a pixel shift system that enables a readout sequence to start at a pixel series position that reduces noise and improves signal quality.

8. The system of claim 7 wherein the pixel shift system enables the readout sequence to start at a fifth pixel series position.

9. A method for generating image data of a component for use in inspecting the component comprising:
   generating pixel data using a CMOS imaging system;
   transferring the pixel data as a plurality of pixel lines, further comprising
      generating a reset command;
      initiating a pixel line at the next clock cycle after the reset command;
      waiting a predetermined number of clock cycles to generate a next pixel line; and
      wherein the predetermined number of clock cycles is less than 208 clock cycles;
   assembling the pixel lines into a frame; and
   wherein the frame is assembled in less than 30 milliseconds.

10. The method of claim 9 wherein generating pixel data using a CMOS imaging system further comprises generating pixel data using a CMOS active pixel sensor.

11. The method of claim 9 wherein generating pixel data using a CMOS imaging system further comprises generating pixel data using a Photobit model PB 1024 CMOS active pixel sensor.

12. The method of claim 9 wherein transferring the pixel data as the plurality of pixel lines further comprises initiating a read sequence for each of the pixel lines at a predetermined pixel series position.

13. The method of claim 9 wherein transferring the pixel data as the plurality of pixel lines further comprises initiating a read sequence for each of the pixel lines at a fourth pixel series position.

14. The method of claim 9 wherein assembling the pixel lines into the frame further comprises reading a first frame following the generation of a reset command.

15. The method of claim 9 wherein the frame is assembled in 13.5 milliseconds.

* * * * *